United States Patent [19]

Sudo et al.

[11] Patent Number: 4,957,990
[45] Date of Patent: Sep. 18, 1990

[54] MATERIALS FOR OPTICAL USE

[75] Inventors: Ryoichi Sudo, Yokosuka; Makoto Kobata, Yokohama; Hiroaki Miwa; Tetsuo Tajima, both of Fujisawa, all of Japan

[73] Assignee: Hitachi, Ltd., Tokyo, Japan

[21] Appl. No.: 257,832

[22] Filed: Oct. 13, 1988

[30] Foreign Application Priority Data

Oct. 14, 1987 [JP] Japan .................. 62-257221

[51] Int. Cl.$^5$ .............................. C08F 36/20
[52] U.S. Cl. .................... 526/282; 526/301
[58] Field of Search ................. 526/282, 301

[56] References Cited

U.S. PATENT DOCUMENTS

| 4,376,800 | 3/1983 | Lu et al. ............... 526/301 |
| 4,812,346 | 3/1989 | Sudo et al. ............. 526/301 |

FOREIGN PATENT DOCUMENTS

| 134861 | 9/1983 | Japan . |
| 60-152515 | 8/1985 | Japan . |
| 61-287913 | 12/1986 | Japan . |

OTHER PUBLICATIONS

English Abstract of Japanese Patent No. 60-152515.
English Abstract of Japanese Patent No. 61-287913.

Primary Examiner—Joseph L. Schofer
Assistant Examiner—Alex H. Walker
Attorney, Agent, or Firm—Fay, Sharpe, Beall, Fagan, Minnich & McKee

[57] ABSTRACT

A polymer excellent in transparency, mechanical properties, moisture resistance suitable for optical use is obtained by copolymerizing a (meth)acrylate compound (I) and a (meth)acrylate compound (II).

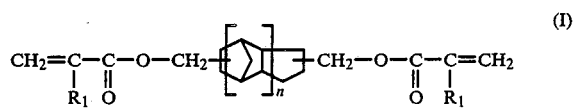

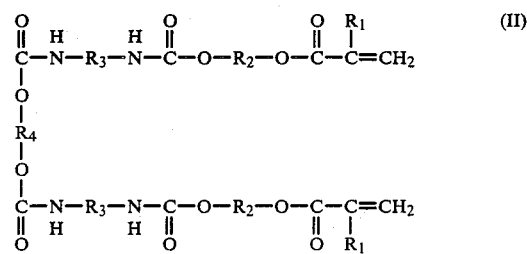

4 Claims, 2 Drawing Sheets

MATERIALS FOR OPTICAL USE

This invention relates to materials for optical use which are capable of providing transparent cured products having excellent heat resistance, high strength and low hygroscopicity.

As a result of their good processability and light weight, plastic materials are popularly used as transparent materials for optical articles such as optical disc substrates, various types of lens, prisms, diffraction grating, etc. Such plastic materials are disclosed, for instance, in Japanese Patent Application Kokai (Laid-Open) Nos. 60-152515 and 61-287913.

Thermoplastic resins such as polycarbonate resin, polystyrene resin and polymethylmethacrylate resin are examples of such plastic materials. These plastic materials, however, possess some serious drawbacks in their practical use. For instance, when these plastic materials are subjected to injection molding, molecular orientation takes place. As a result it is difficult to perfectly eliminate optical distortion or mechanical strain. Also, because of the poor heat resistance of these materials, the molded products made from the plastic materials suffer from heat distortion or deformation on moisture absorption.

In order to overcome these difficulties casting of liquid-state crosslinkable resin compositions into the mold has been proposed for solving the problem of molecular orientation at the time of molding. However, such resins have their own problems. For instance, diethylene glycol bisallylcarbonate resin, which has been used for lens of eyeglasses and the like, is unsatisfactory for productivity because of its low reaction rate and its poor heat and moisture resistances. In order to solve these problems, use of polyfunctional (meth)acrylate compounds having an alicyclic skeleton has been proposed (Japanese Patent Application Kokai (Laid-Open) No. 60-152515, etc.). This proposal, however, was not quite satisfactory because the cured products of such compounds exhibited low mechanical strength. Attempts to overcome this problem were proposed in Japanese Patent Application Kokai No. 61-287913, etc., but these attempts still could not provide a satisfactory solution because the products disclosed therein exhibited increased hygroscopicity and also failed to improve the mechanical strength of the product to a satisfactory degree.

Accordingly, it is an object of the present invention to provide a transparent material for optical use which is lower in optical anisotropy, superior in mechanical strength, high in heat distortion temperature and stable under high humidity, thereby eliminating the above-mentioned defects of the prior art.

The present invention provides a material for optical use by means of the radical copolymerization of 90 to 20% by weight of a (meth)acrylate compound represented by the following formula (I) and 10 to 80% by weight of a (meth)acrylate compound represented by the following formula (II):

(I)

(II)

wherein n is 1 to 6; $R_1$ is —H or —$CH_3$; $R_2$ is in which $R_5$ is —H, an alkyl group having 1 to 5 carbon atoms or

$R_3$ is a hydrocarbon group having 6 to 16 carbon atoms including among which preferable one is

-continued or

$R_4$ is a hydrocarbon group having 2 to 300 carbon atoms including

—CH$_2$—CH—CH$_2$—CH$_2$—CH$_2$—CH$_2$—,
      |
      CH$_2$—CH$_3$

-continued and $-(CH_2-\underset{\underset{CH_3}{|}}{\overset{\overset{CH_3}{|}}{C}})_{\overline{1-75}}$, among which preferable one is $-(CH_2)_{\overline{10}}-$, $-(CH_2)_{\overline{12}}-$, $-(CH_2)_{\overline{14}}-$, $-(CH_2)_{\overline{18}}-$,

$-(CH_2)_{\overline{20}}-$, $-(CH_2)_{\overline{5}}CH-(CH_2)_{\overline{4}}CH-(CH_2)_{\overline{5}}$,
                                    |                  |
                                    CH$_3$             CH$_3$

$-(CH_2CH_2)_{\overline{5-60}}$ or $-(CH_2-\underset{\underset{CH_3}{|}}{\overset{\overset{CH_3}{|}}{C}})_{\overline{5-60}}$.

The (meth)acrylate compound of the formula (I) used as one component for the radical copolymerization in the present invention is effective for providing the polymerized material with the elevated heat distortion temperature, increased modulus of elasticity, improved surface hardness and decreased hygroscopicity. A greater improvement in the hygroscopicity is obtained as the number of n in the compound of the formula (I) increases, but it should be noted that viscosity of the compound becomes so high as to be intractable when n is greater than 7. The amount of compound of the formula (I) used in the radical copolymerization in the invention is preferably in the range of 20 to 90% by weight. When the amount is less than 20% by weight, it becomes difficult to maintain the desired heat distortion temperature of the obtained material, and when it exceeds 90% by weight, a reduction of mechanical strength or an increase of optical distortion of the obtained material for optical use results.

Shown below are examples of compounds of the formula (I):

bis(acryloxymethyl)tricyclo[5.2.1.0$^{2,6}$]decane, bis(methacryloxymethyl)tricyclo[5.2.1.0$^{2,6}$]decane, bis(acryloxymethyl)pentacyclo[6.5.1.1$^{3,6}$.0$^{2,7}$.0$^{9,13}$]pentadecane bis(methacryloxymethyl)pentacyclo[6.5.1.1$^{3,6}$.0$^{2,7}$.0$^{9,13}$]pentadecane, bis(acryloxymethyl)heptacyclo[10.5.1.1$^{3,10}$.1$^{5,8}$.0$^{2,11}$.0$^{4,9}$.0$^{13,17}$]eicosane, and bis(methacryloxymethyl)heptacyclo[10.5.1.1$^{3,10}$.1$^{5,8}$.0$^{2,11}$ 0$^{4,9}$.0$^{13,17}$]eicosane.

Among the above, those having n larger than 2 in the formula (I) are preferable.

The (meth)acrylate compound of the formula (II) in the present invention provides the mechanical strength desired by the material for optical use. The compound is used preferably in an amount of 10 to 70% by weight. When the amount is less than 10% by weight, the properties produced by the compound are unsatisfactory, and when it exceeds 80% by weight, the viscosity of the compositions to be cured increases thereby producing poor workability. In addition, when the compound of formula (II) exceeds 80% by weight the heat resistance of the cured material becomes lower.

The compound represented by the formula (II) has four urethane bonds in one molecule, which is believed to attribute to the improved mechanical strength of the material according to the invention. Urethane bonds have disadvantageous tendency of absorbing water, but in the present invention, water absorption of the compound as a whole has been reduced by increasing the number of carbon atoms of the hydrocarbon group represented by R$_4$ in the formula (II). Increase in the number of carbon atoms of R$_4$ leads to an additional merit of enhancing the mechanical strength of the material. It also provides better compatibility of the compound with the (meth)acrylate compound of the formula (I).

For synthesizing the compound of the formula (II), there are methods, for instance, 2 moles of a diisocyanate is reacted with 1 mole of a diol, and then 2 moles of a monohydroxylated (meth)acrylate is added thereto for reaction with the residual isocyanate groups. These compounds may be reacted in the form as they are, but they may be reacted in such an organic solvent inert to the isocyanates as toluene, xylene and the like. A tin type catalyst such as di-n-butyltin dilaurate may be used as a reaction accelerator. When carrying out the reaction, temperature of the reaction system is maintained at 50 to 70° C.

Examples of the diols usable in the above reaction are: ethylene glycol, propylene glycol, 1,4-butanediol, 1,5-pentanediol, neopentyl glycol, 1,6-hexanediol, 2-ethylhexyldiol, 1,10-decanediol, 1,12-dodecanediol, 1,14-tetradecanediol, 1,20-eicosanediol, 1,4-cyclohexyldimethanol, poly-1,2-butadienediol, hydrogenated poly-1,2-butadienediol, and polybudenediol.

Examples of the diisocyanates usable in the above reaction are; 2,4-tolyene diisocyanate, 4,4'-diphenylmethane diisocyanate, 2,2'-diphenylpropane-4,4'-diisocyanate, 2,4- methylcyclohexane diisocyanate, methylenebis(4-cyclohexylisocyanate), 2,2'-propylenebis(4-cyclohexyl isocyanate), isophorone diisocyanate, 1,6-hexamethylene diisocyanate, and 1,16-hexadecamethylene diisocyanate.

Examples of the monohydroxylated (meth)acrylates usable in the above reaction are; 2-hydroxyethyl (meth)acrylate, 2-hydroxypropyl (meth)acrylate, 2-hydroxybutyl (meth)acrylate, 2-hydroxypentyl (meth)acrylate, and 2-hydroxy-=3-phenoxypropyl (meth)acrylate.

The material for optical use according to the present invention can be obtained by polymerizing the (meth)acrylate compounds of the formula (I) and the formula (II) in the presence of a radical polymerization initiator in an amount of 0.1 to 5 parts by weight per 100 parts by weight in total of the-(meth)acrylate compounds. When the amount of the radical polymerization initiator is less than 0.1 parts by weight, the polymerization does not proceed satisfactorily, while use of the polymerization initiator in excess of 5 parts by weight tends to cause a reduction of mechanical strength in the cured resin product.

In the present invention, there can be used any type of radical polymerization initiator so long as it is capable of forming radicals in the (meth)acrylate compounds to cause radical polymerization of the acrylic and methacrylic groups in the compounds. Usually, a thermal polymerization initiator or a photopolymerization initiator is used.

As the thermal polymerization initiator, there can be favorably used peroxides such as benzoyl peroxide, diisopropyl peroxycarbonate, lauroyl peroxide, di-tert-butyl peroxide, etc., and azo compounds such as azoisobutylonitrile. If necessary, a reaction accelerator such as cobalt naphthenate, dimethylaniline, etc. may be used for promoting the radical formation in the thermal polymerization initiator.

As the photopolymerization initiator, there can be used, for instance, benzyls; benzoins such as benzoin, benzoin ethyl ether, benzoin isopropyl ether and benzoin isobutyl ether; benzophenones such as benzophenone and 4-methoxybenzophenone; acetophenones such as acetophenone and 2,2-diethoxyacetophenone; thioxanthones such as 2-chlorothioxanthone and 2-methylthioxanthone; anthraquinones such as 2-ethylanthraquinone and 2-methylanthraquinone; benzyldimethylketal, 1-hydroxycyclohexylphenyl ketone, 2-hydroxy-2-methyl-1-phenylpropane-1-one, 1-(4-isopropylphenyl)-2-hydroxy-2-methyopropane-1-one, and the like.

The objective material of the present invention can well be obtained by merely polymerizing the (meth)acrylate compounds of the formula (I) and the formula (II) in the presence of the radical polymerization initiator, however, for the purpose of adjusting viscosity of the reactant and hardness of the product, an ordinary radical polymerizable monomer may be added in an amount of not exceeding 20% by weight and within a range not affecting the excellent properties of the material.

As the ordinary radical polymerizable monomer, the followings are useful in the present invention:

Monofunctional monomers: cyclohexyl (meth)acrylate, bornyl (meth)acrylate, isobornyl (meth)acrylate, dicyclopentenyl (meth)acrylate, tricyclodecanyl (meth)acrylate, n-hexyl (meth)acrylate, n-decyl (meth)acrylate, 2-ethylhexyl (meth)acrylate, n-decyl (meth)acrylate, lauryl (meth)acrylate, tridecyl (meth)acrylate and the like.

Bifunctional monomers: neopentyl glycol di(meth)acrylate, 1,6-hexanediol di(meth)acrylate, 1,10-decanediol di(meth)acrylate, 1,12-dodecanediol di(meth)acrylate and the like.

According to the invention, there is provided a material for optical use which is lower in distortion and has excellent mechanical properties with superior resistance to heat and moisture. The present invention, accordingly, makes it possible to realize high performance of optical products such as optical disc substrates, lenses, prisms, diffraction gratings, etc.

The present invention will be explained more in detail below with reference to Examples thereof.

EXAMPLE 1

Bis(acryloxymethyl)tricyclo(5.2.1.0$^{2,6}$)decane (compound 1) was used as a compound of the formula (I). Also, as a compound of the formula (II), there was prepared the below-identified product (compound 2) by reacting 1 mole of 1,10-decanediol and 2 moles of isophorone diisocyanate, and then adding 2 moles of 2-hydroxybutyl methacrylate:

Further, 1,10-decandediol diacrylate (compound 3) was employed as the ordinary monomer.

Compound 1 and compound 2 were combined to form a composition of Example 1, while compound 1 and compound 3 were combined to form a composition of the Comparative Example. To each of said composition was added a photopolymerization initiator benzoinisopropyl ether in an amount of 2 parts by weight to 100 parts by weight of the composition, and was mixed and dissolved to prepare a photosetting resin composition.

Figure 1:
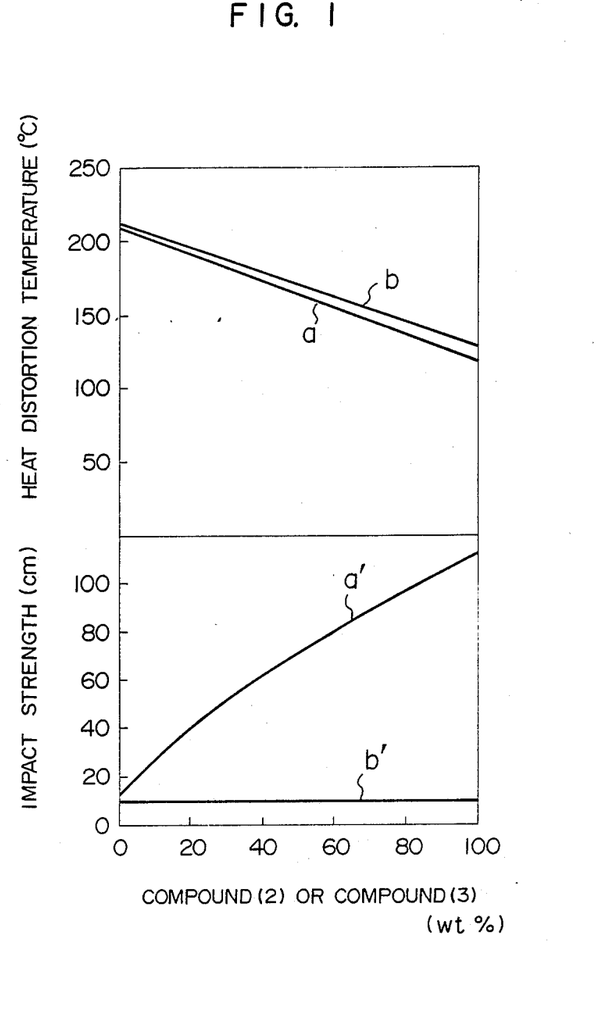
FIG. 1 and FIG. 2 are drawings illustrating the relationship between properties of the material and the compositions.

A pair of 1 mm thick quartz glass plate were placed parallel to each other with a spacing of 1.1 mm. The previously prepared photosetting resin composition was poured in between the quartz glass plates, and irradiated for a period of 30 seconds with ultraviolet light of 100 mW/cm$^2$ at 365 nm from a high pressure mercury lamp to have the resin composition cured. The cured resin was removed from the glass plates and subjected to a heat treatment at 100° C. for one hour to obtain a product. Properties of the product were determined, and the results are shown in FIG. 1. In FIG. 1, a, a' indicate the Example and b, b' indicate the Comparative Example. The combining ratio of compound (2) or compound (3) is shown on the abscissa, where compound (1) decreases to the right.

(1) Heat distortion temperature

A sample plate (15×5×1 mm) was heated under a load of 0.5 g applied thereto in the longitudinal direction, and the elongation of the plate by heating was measured. The heat distortion temperature was determined from the inflexion point of the temperature-elongation relationship curve. It is desirable that the heat distortion temperature of the material for optical use is higher than 100° C.

(2) Impact strength

A weight having at the end a 10 mm φ steel ball was dropped vertically from predetermined heights onto a 1 mm thick sample plate placed on a steel block, and the height of drop causing the sample plate to crack was measured in cm. It is desirable that the material for optical use has an impact strength greater than 30 cm.

The cured product of the compound 1 of the formula (I) has a high heat distortion temperature but is low in the mechanical impact strength The cured product of the compound 2 of the formula (II) is rather low in its heat distortion temperature but has a high mechanical impact strength. Combination of compound 1 and compound 2 can provide a material for optical use which is improved in both heat distortion temperature and impact strength.

On the other hand, no improvement of impact strength was seen in the composition of the Comparative Example comprising a combination of compound 1 and compound 3 which is an ordinary monomer.

In the composition of Example 1, when the amount of compound 1 in the composition is greater than 10% by weight, it enables the product to maintain the impact strength higher than the level of 30 cm which is required for practical use of the optical elements such as optical discs and lenses. In this case, when the amount of compound 2 is greater than 80% by weight, the viscosity of the composition becomes higher than 600 poises at 25° C., which deteriorates casting workability of the composition.

EXAMPLE 2

The compound of the following formula was employed as a compound of the formula (I), in which n was varied:

The compound of the following formula was used as a compound of the formula (II), in which $R_4$ was varied:

The compounds of formulae (I) and (II) were mixed in various combinations at ratio of 1:1 by weight, and the compatibility was evaluated as shown in Table 1.

As seen from Table 1, the compounds of formula (I) where n are small are compatible with the compounds of formula (II) where the carbon number of $R_4$ are small. When polymerized by using a radical polymerization initiator and cured, the compatible composition can produce a transparent material, but the incompatible composition causes clouding or undergoes phasial separation and the cured product is unsuitable as a material for optical use.

When a compound of formula (I) with a large n and a compound of formula (II) with a large carbon number $R_4$ are combined, there can be obtained a compatible composition, and further, it becomes possible to reduce the concentration of the water-absorptive polar groups such as —O— and =NH.

EXAMPLE 3

Bis(acryloxymethyl)pentacyclo[$6.5.1.1.^{3,6}.0^{2,7}.0^{9,13}$] pentadecane (compound 4) was employed as a compound of the formula (I). As the compounds of the formula (II), there were employed those use in Example 2 in which $R_4$ was Compound 4 and compound 5 were combined to form a composition A, and compound 4 and compound 6 were combined to form a composition B. To each of said compositions was added a photopolymerization initiator 1-hydroxycyclohexylphenyl ketone in an amount of 1 part by weight to 100 parts by weight of the composition, and was mixed and dissolved to prepare a photosetting resin composition.

Figure 2:
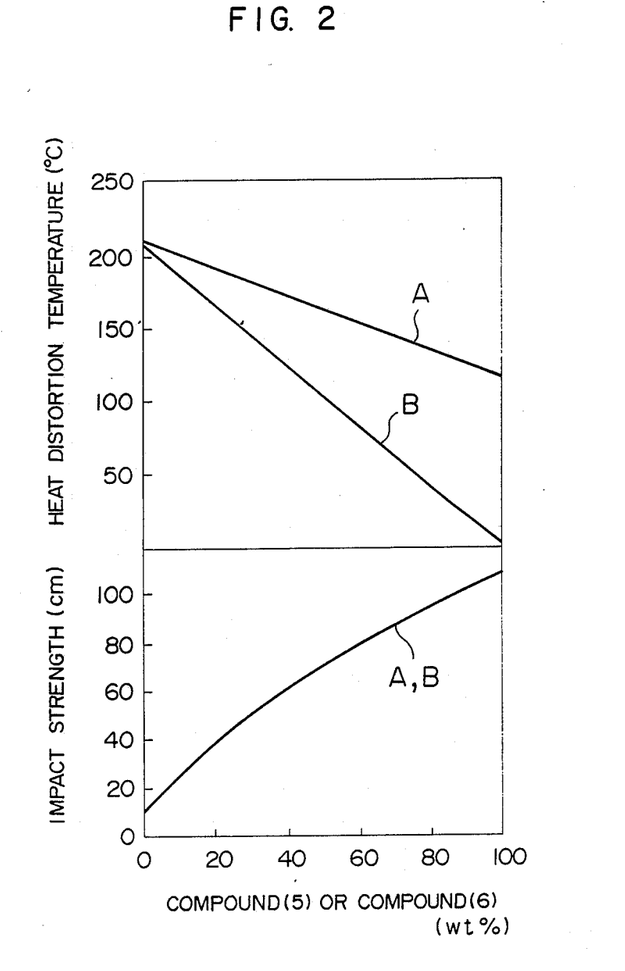

The thus prepared photosetting resin compositions were cured, and the heat distortion temperature and impact strength of the cured resins were determined in the same manner as in Example 1, and the results are shown in FIG. 2. In FIG. 2, A indicates the composition A and B indicates the composition B.

Both composition A and composition B show heat distortion temperature and impact strength (100° C or above and 30 cm or above, respectively) satisfactory to the optical discs, lenses, etc.

EXAMPLE 4

The compounds of formula (I), the compounds of formula (II) and the ordinary monomers were mixed in various combinations to form the compositions shown in Table 2. To each of these compositions was added a photopolymerization initiator 2-hydroxy-2-methyl-1-phenylpropane-1-one in a ratio of 1 part by weight to 100 parts by weight of the composition, and was mixed and dissolved to prepare a photosetting resin composition.

The thus prepared photosetting resin compositions were cured, and the following properties of the cured resins were determined in addition to the heat distortion temperature and impact strength which were determined in the same ways as in Example 1. The results are shown in Table 3.

(3) Workability

In casting a liquid resin composition into a mold, when the viscosity of the composition at 25° C. exceeds 600 poises, it becomes extremely difficult to work even pressure is applied. Therefore, this vicosity was referred to as the measure of workability.

(4) Water absorption

A 1 mm thick flat plate was kept immersed in water of 25° C. for 7 days and water absorption was determined from the weight gain of the plate after the immersion. The smaller the water absorption, the less tendency there is for the material to suffer dimensional deformation by absorption of moisture. For a material for optical use, it is desirable that water absorption is less than 1.2%, more preferably less than 0.5%.

(5) Retardation

Retardation (R) in a single pass at a wavelength of 830 nm was determined [$R = d(n_1 - n_2)$ wherein d is thickness of the transparent plate, and $n_1$ and $n_2$ are refractive indexes of 1 and 2 respectively, in the direction of the principal stress]. It is desirable that retardation is less than 10 nm, more preferably less than 5 nm.

None of the composition Nos. 1-6 of the Comparative Examples can satisfy all of the targets for a material for optical use, namely heat distortion temperature of higher than 100° C., impact strength of greater than 30 cm, water absorption of less than 1.2% and retardation of less than 10 nm in addition to the excellent workability. On the other hand, composition Nos. 1-14 of the Examples of the present invention can meet with all of the target requirements.

Composition Nos. 4-8 and 12-14 of the Examples show as low a water absorption as less than 0.5%, so that they are especially suited for uses where moisture resistance is required.

Composition Nos. 1-14 of the Examples have a refractive index in the range of 1.49 to 1.52, a modulus of photoelasticity in the range of 1 to $2 \times 10^{-4}$ mm$^3$/kg and a light transmittance of 90 to 98%. Thus, all of these compositions have the excellent properties for use as a material for optical elements.

EXAMPLE 5

To each of the composition shown in Table 2 was added benzoyl peroxide in a ratio of 1.5 parts by weight to 100 parts by weight of the composition, and was mixed and dissolved to prepare a thermosetting resin composition.

A pair of 1 mm thick soda glass plates were placed parallel to each other with a spacing of 1.1 mm, and each of the previously prepared thermosetting resin composition was poured therebetween and cured at 100° C for 2 hours. The cured resin was removed from the glass plates to obtain a specimen. The heat distortion temperature, impact strength and water absorption of the specimen were determined in the same ways as described previously. The results are similar to those shown in Table 3. Any of the composition Nos. 1–14 of the Examples shows a retardation less than 5 nm and is thus excellent as a material for optical use.

TABLE 1

| Compound of formula (II) | Compound of formula (I) $n$ | | |
|---|---|---|---|
| | 1 | 2 | 4 |
| $R_4$ $-(CH_2)_6-$ | Compatible | Slightly compatible | Incompatible |
| $-(CH_2)_{10}-$ | Compatible | Compatible | Slightly compatible |
| $-(CH_2)_{20}-$ | Compatible | Compatible | Compatible |
| $-(CH_2-CH)_{18}-$ $\;\;\;\;\;\;\;\;\;\;\;\;\;\;\;\;\;\;\;\;\;\;$ $\;\;\;\;\;\;\;\;\;\;\;\;\;CH_2$ $\;\;\;\;\;\;\;\;\;\;\;\;\;CH_3$ | Incompatible | Compatible | Compatible |
| $-(CH_2-CH)_{54}-$ $\;\;\;\;\;\;\;\;\;\;\;\;\;\;\;\;\;\;\;\;\;\;$ $\;\;\;\;\;\;\;\;\;\;\;\;\;CH_2$ $\;\;\;\;\;\;\;\;\;\;\;\;\;CH_3$ | Incompatible | Compatible | Compatible |

TABLE 2

| Components | | Comparative Examples | | | | | | Examples Composition No. | | | | | | | | | | | |
|---|---|---|---|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 | 9 | 10 | 11 | 12 | 13 | 14 |
| Compound of formula (I) | $CH_2=CH-C(=O)-O-CH_2-$[dicyclic]$-CH_2-O-C(=O)-CH=CH_2$ | 100 | — | — | — | 50 | 70 | 50 | 50 | — | — | — | — | — | — | — | 48 | — | — | — | — |
| | $CH_2=CH-C(=O)-O-CH_2-$[tricyclic]$-CH_2-O-C(=O)-CH=CH_2$ | — | 100 | — | — | — | — | — | — | 50 | 50 | — | — | 90 | 70 | 50 | — | 48 | 48 | 48 | 45 | 40 |
| | $CH_2=C(CH_3)-C(=O)-O-CH_2-$[tetracyclic]$-CH_2-O-C(=O)-C(CH_3)=CH_2$ | — | — | — | — | — | — | — | — | — | — | 50 | 50 | — | — | 20 | — | — | — | — | — |
| Compound of formula (II) | $\{CH_2=CH-C(=O)-O-CH_2-C(C_2H_5)(CH_2Ph)-C(=O)-NH-C_6H_4-NH-C(=O)-(CH_2)_{10}-\}_2$ | — | — | — | — | — | — | 50 | 50 | 50 | — | — | — | — | — | — | — | — | — | — | — |
| | $\{CH_2=C(CH_3)-C(=O)-O-CH_2-C(CH_3)(C_2H_5)-C(=O)-NH-CH_2-C(CH_3)_2-CH_2-C(CH_3)_2-NH-C(=O)-\}_2(CH_2)_{20}$ | — | — | 100 | — | — | — | — | — | — | 50 | — | — | — | — | — | — | — | — | — | — | — |
| | $\{CH_2=CH-C(=O)-O-CH_2-C(CH_3)(C_2H_5)-C(=O)-NH-C_6H_4-NH-C(=O)-O-\}_2[-CH_2-C(CH_3)_2-CH_2-C(CH_3)_2-]_{18}$ | — | — | — | 100 | — | — | — | — | — | — | 50 | — | — | — | — | — | 48 | — | — | — | — |
| | $\{CH_2=C(CH_3)-C(=O)-O-(CH_2)_2-O-C(=O)-NH-C_6H_3(CH_3)-NH-C(=O)-O-\}_2[-CH_2-CH(CH_2CH_3)-]_{36}$ | — | — | — | — | — | — | — | — | — | — | — | 50 | 10 | 30 | 50 | — | — | 48 | 45 | 40 |

TABLE 2-continued

| Components | | Comparative Examples | | | | | | Examples Composition No. | | | | | | | | | | | | |
|---|---|---|---|---|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 | 9 | 10 | 11 | 12 | 13 | 14 |
| Ordinary monomer | $CH_2=C-C-O(CH_2)_7O-C-C=CH_2$ with $CH_3$, $O$, $O$, $CH_3$ | — | — | — | — | 50 | — | — | — | — | — | — | — | — | — | 4 | — | — | — | — | — |
| | $CH_2=CH-C-O(CH_2)_{10}-O-C-CH=CH_2$ with $O$, $O$ | — | — | — | — | — | — | — | — | — | — | — | — | — | — | — | 4 | 4 | 4 | — | — |
| | Isobornyl methacrylate $CH_2=C-C-O$ with $CH_3$, $O$ | — | — | — | — | — | 30 | — | — | — | — | — | — | — | — | — | — | — | — | 10 | 20 |

… TABLE 3

| Properties | Comparative Examples | | | | | | Examples | | | |
|---|---|---|---|---|---|---|---|---|---|---|
| Composition No. | 1 | 2 | 3 | 4 | 5 | 6 | 1 | 2 | 3 | 4 |
| Workability | Good | Good | Poor | Poor | Good | Good | Good | Good | Good | Good |
| Heat distrotion temperature (°C.) | 210 | 213 | 110 | 0 | 190 | 190 | 155 | 150 | 150 | 110 |
| Impact strength (cm) | 10 | 10 | Over 100 | Over 100 | 5 | 5 | 65 | 60 | 70 | 65 |
| Water absorption (%) (after 7-day immersion in 25° C. water) | 1.2 | 0.5 | 2.5 | 0.2 | 1.5 | 0.9 | 1.2 | 1.2 | 0.9 | 0.3 |
| Retardation (nm) (830 nm, 1 mm thick plate) | 10 | 10 | 3 | 1 | 20 | 1 | 4 | 3 | 3 | 2 |

| Properties | Examples | | | | | | | | | |
|---|---|---|---|---|---|---|---|---|---|---|
| Composition No. | 5 | 6 | 7 | 8 | 9 | 10 | 11 | 12 | 13 | 14 |
| Workability | Good | Good | Good | Good | Good | Good | Good | Good | Good | Good |
| Heat distrotion temperature (°C.) | 101 | 190 | 140 | 101 | 140 | 160 | 161 | 115 | 105 | 101 |
| Impact strength (cm) | 65 | 30 | 52 | 65 | 90 | 65 | 65 | 60 | 63 | 60 |
| Water absorption (%) (after 7-day immersion in 25° C. water) | 0.2 | 0.4 | 0.3 | 0.3 | 1.1 | 1.2 | 0.9 | 0.3 | 0.3 | 0.3 |
| Retardation (nm) (830 nm, 1 mm thick plate) | 2 | 5 | 3 | 3 | 4 | 5 | 4 | 3 | 1 | 1 |

What is claimed is:

1. A material for optical use obtained by subjecting to radical copolymerization 90 to 20% by weight of a (meth)acrylate compound represented by the following formula (I) and 10 to 80% by weight of a (meth)acrylate compound represented by the following formula (II):

(I)

(II)

wherein n is 1 to 6; $R_1$ is —H or —$CH_3$; $R_2$ is in which $R_5$ is —H, an alkyl group having 1 to 5 carbon atoms or $R_3$ is a hydrocarbon group having 6 to 16 carbon atoms; and $R_4$ is a hydrogen group having 2 to 300 carbon atoms.

2. A material according to claim 1, wherein said material is used as a substrate of an optical disc.

3. A material for optical use having a heat distortion temperature of greater than 100° C., an impact strength of greater than 30 cm, water absorption of less than 1.2%, retardation of less than 10 nm and excellent workability, said material having been prepared by subjecting to radical copolymerization 90 to 20% by weight of a (meth)acrylate compound represetned by the following Formula (I) and 10 to 80% by weight of a (meth)acrylate compound represented by the following Formula (II):

(I)

(II)

wherein n is 1 to 6; $R_1$ is —H or —$CH_3$; $R_2$ is in which $R_5$ is —H, and alkyl group having 1 to 5 carbon atoms or

$R_3$ is a hydrocarbon group having 6 to 16 carbon atoms; and $R_4$ is a hdyrocarbon group having 2 to 300 carbon atoms.

4. A material for optical use having a heat distortion temperature of greater than 100° C., an impact strength of greater than 30 cm, water absorption of less than 1.2% and retardation of less than 10nm in addition to excellent workability, said material having been prepared by subjecting to radical copolymerization 90 to 20% by weight of a (meth)acrylate compound represented by the following Formula (I) and 10 to 80% by weight of a (meth)acrylate compound represented by the following Formula (II):

(I)

(II)

wherein n is 2 to 6; $R_1$ is —H or —$CH_3$; $R_2$ is in which $R_5$ is —H, an alkyl group having 1 to 5 carbon atoms or $R_3$ is a hydrocarbon group having 6 to 16 carbon atoms; and $R_4$ is a hydrocarbon group having 2 to 300 carbon atoms.

* * * * *

UNITED STATES PATENT AND TRADEMARK OFFICE
CERTIFICATE OF CORRECTION

PATENT NO. : 4,957,990

DATED : September 18, 1990

INVENTOR(S) : Sudo et al

It is certified that error appears in the above-identified patent and that said Letters Patent is hereby corrected as shown below:

On the title page item [73] Assignee: should read as follows:

-- [73] Assignee: Hitachi, Ltd., Tokoyo, Japan and
          Hitachi Maxell, Ltd., Osa, Japan--

Signed and Sealed this

Fourteenth Day of July, 1992

Attest:

DOUGLAS B. COMER

*Attesting Officer*      *Acting Commissioner of Patents and Trademarks*